(12) United States Patent
Becker et al.

(10) Patent No.: US 7,552,257 B2
(45) Date of Patent: Jun. 23, 2009

(54) DATA TRANSMISSION DEVICE WITH A DATA TRANSMISSION CHANNEL FOR THE TRANSMISSION OF DATA BETWEEN DATA PROCESSING DEVICES

(75) Inventors: Burkhard Becker, Ismaning (DE); Werner Hein, München (DE); David Jennings, München (DE); David Sellar, München (DE)

(73) Assignee: Infineon Technologies AG, Munich (DE)

( * ) Notice: Subject to any disclaimer, the term of this patent is extended or adjusted under 35 U.S.C. 154(b) by 99 days.

(21) Appl. No.: 10/543,570

(22) PCT Filed: Dec. 18, 2003

(86) PCT No.: PCT/EP03/14527

§ 371 (c)(1),
(2), (4) Date: May 2, 2006

(87) PCT Pub. No.: WO2004/068357

PCT Pub. Date: Aug. 12, 2004

(65) Prior Publication Data

US 2007/0006029 A1    Jan. 4, 2007

(30) Foreign Application Priority Data

Jan. 27, 2003    (DE) ................................ 103 03 095

(51) Int. Cl.
G06F 13/00 (2006.01)
(52) U.S. Cl. ........................... 710/100; 710/22; 710/107; 370/342
(58) Field of Classification Search .................... 710/22, 710/100, 107; 370/342
See application file for complete search history.

(56) References Cited

U.S. PATENT DOCUMENTS

| | | | | | |
|---|---|---|---|---|---|
| 4,319,338 | A | * | 3/1982 | Grudowski et al. | 710/109 |
| 4,642,758 | A | * | 2/1987 | Teng | 707/10 |
| 4,791,639 | A | * | 12/1988 | Afheldt et al. | 370/374 |
| 5,276,703 | A | * | 1/1994 | Budin et al. | 375/130 |
| 5,280,472 | A | * | 1/1994 | Gilhousen et al. | 370/335 |
| 5,469,549 | A | * | 11/1995 | Simpson et al. | 709/213 |
| 5,805,585 | A | * | 9/1998 | Javitt et al. | 370/342 |
| 5,956,493 | A | * | 9/1999 | Hewitt et al. | 710/113 |
| 6,108,722 | A | | 8/2000 | Troeller et al. | |

(Continued)

FOREIGN PATENT DOCUMENTS

DE    199 09 921 A1    9/2000

(Continued)

Primary Examiner—Paul R Myers
(74) Attorney, Agent, or Firm—Maginot, Moore & Beck (57) ABSTRACT

The present invention provides a data processing apparatus having at least one dedicated data processing device (10) of a first type, a central data processing device (4) for controlling dedicated data processing devices (10, 12, 14), at least one data transmission channel (16) for transmitting data between the data processing devices (4, 10, 12, 14) and a data transmission device (6) for transmitting data between the data processing devices via the at least one data transmission channel (16) in a manner dependent on data transmission parameters, the data transmission parameters which are assigned to the at least one dedicated data processing device (10) of the first type being generated by the at least one dedicated data processing device (10) of the first type.

18 Claims, 5 Drawing Sheets

U.S. PATENT DOCUMENTS

| | | | |
|---|---|---|---|
| 6,335,922 B1* | 1/2002 | Tiedemann et al. | 370/335 |
| 6,366,606 B1* | 4/2002 | Sriram | 375/150 |
| 6,374,112 B1* | 4/2002 | Widegren et al. | 455/452.2 |
| 6,600,581 B1* | 7/2003 | Fatehi et al. | 398/9 |
| 6,625,210 B1* | 9/2003 | Boissel et al. | 375/222 |
| 2002/0128035 A1 | 9/2002 | Jokinen et al. | |
| 2003/0103557 A1* | 6/2003 | Dolwin | 375/150 |
| 2005/0014474 A1* | 1/2005 | Jitsukawa et al. | 455/101 |
| 2005/0018614 A1* | 1/2005 | Kiran | 370/252 |
| 2005/0053081 A1* | 3/2005 | Andersson et al. | 370/401 |

FOREIGN PATENT DOCUMENTS

| | | |
|---|---|---|
| EP | 0 671 718 B1 | 1/2002 |
| GB | 2 367 728 A | 4/2002 |
| WO | WO 98/32080 A1 | 7/1998 |
| WO | WO 01/46815 A1 | 6/2001 |

* cited by examiner

DATA TRANSMISSION DEVICE WITH A DATA TRANSMISSION CHANNEL FOR THE TRANSMISSION OF DATA BETWEEN DATA PROCESSING DEVICES

FIELD OF THE INVENTION

The invention relates to a data processing apparatus and in particular to a transmission of data with varying data rates and data structures between data processing devices in a data processing apparatus.

BACKGROUND

In a typical data processing apparatus, data have to be moved between dedicated data processing devices, a controller and/or a central data processing device and an internal or external memory. The individual elements of the data processing apparatus are connected to one another via data buses, the data buses being connected to the data processing devices via bridges and an arbitration logic. The bridges are synchronization elements between the individual dedicated data processing devices, the central data processing device and the buses, etc. which serve e.g. for frequency matching. Such data processing systems are also used for example in the components of radio telecommunication systems.

One current example of a radio telecommunication system is the universal mobile telecommunications system (UMTS). The basic architecture of a UMTS radio telecommunication system has mobile stations or subscriber terminals (user equipment (UE)), a radio access network (RAN), a core network (CN) and a radio interface. The radio access network comprises devices for radio transmission of data and for this purpose has base stations, called node B in the case of UMTS, and a radio network controller (RNC), which links the radio access network to the core network. The base stations in each case provide coverage for a specific area or a cell in which mobile stations may be situated. The core network is the long-distance communications network that transports the users' data to the respective destination. For this purpose, the core network contains a multiplicity of switching devices and also gateways to other networks, for example the integrated services digital network (ISDN) or the Internet. The radio interface is the interface between a mobile station and a base station, the communication of which is effected via radio.

In the case of a UMTS radio telecommunication system, digital data to be transmitted are firstly subjected to a channel coding in order to provide the digital data with a redundancy. The digital data are then distributed between physical channels by means of a multiple access method in time frames of the available transmission bandwidth. Finally, the digital data are digitally modulated in order to be transmitted via a mobile radio channel. The mobile radio channel is divided in the time domain or frequency domain for a transmission operating mode and a reception operating mode by means of a time division duplex method (TDD) or a frequency division duplex method (FDD).

As a result of the channel coding, the data to be transmitted are protected against erroneous transmission via a mobile radio channel subjected to interference, or the redundancy enables error correction at the respective receiver of the data. Linear block codes or convolutional codes are generally used for channel coding. The Viterbi algorithm is often employed for decoding convolutional codes, such as e.g. turbo codes.

In the case of UMTS, a multiple access method used is the code division multiple access method CDMA, in which the bipolar data bit stream to be transmitted is multiplied and spread using a subscriber-specific bipolar code sequence or a spreading code. The elements of the spreading code are called chips in order to be able to distinguish them semantically from the bits of the data bit stream. Chips are in principle no different than bits. The multiplication of the data bit stream by the chip stream results in the spread bipolar data stream. Generally, the rate of the chip stream is a multiple of the rate of the data bit stream and is determined by the length of the spreading code, the so-called spreading factor SF. The data stream resulting from the phase-correct multiplication has the rate of the chip stream. The multiple access method is employed by all subscribers to impress a fingerprint on their useful data by means of a subscriber-specific spreading code, which fingerprint permits the transmitted signal to be recovered from the sum of the received signals. In the receiver, the bits of the data bit stream can be recovered from the received chip sequence by repeating the multiplication operation. For this purpose, the chip stream is once again multiplied in phase-correct fashion by the same spreading code that has already been used in the transmitter, which results in the transmitted data bit stream. Different data bit streams that are intended to be transmitted in parallel from the transmitter are multiplied by different, orthogonal code sequences or spreading codes and subsequently added. The summation signal subsequently also undergoes a so-called scrambling, which is effected by means of a chipwise multiplication of the summation signal by a cell-specific or station-specific scrambling code and identifies the cell or the base station.

In the case of UMTS, a modulation method employed is quaternary phase shift keying (QPSK), in which in each case two successive chips (bits) of a chip sequence to be transmitted are combined to form a chip pair. A chip pair in each case forms a symbol of a symbol space spanned by an inphase branch and a quadrature branch of the QPSK modulation in the complex plane, which has four elements. On account of the four-valued modulation method, two chips in each case are thus transmitted per modulation step. The gross chip rate is therefore twice as large as the modulation rate.

In the case of the UMTS, the time structure of the multiple access is divided into so-called time frames each of 10 ms. The duration of a time frame corresponds to the duration of 38 400 chips; the modulation rate is therefore 3.84 Mchips/s. Each time frame is subdivided into 15 time slots having a length of 666 µs, corresponding precisely to the duration of 2 560 chips. The chip duration is approximately 0.2604 µs.

In order to separate transmission signals and reception signals of a base station or of a mobile station or in order to separate the uplink from the mobile station to the base station and the downlink from the base station to the mobile station, UMTS radio telecommunication systems preferably use the time division duplex method (TDD), for example, in which transmission times and reception times alternate periodically within a frequency band. In the case of the frequency division duplex method (FDD), the uplink and downlink are separated by different frequency bands. Within a transmission direction, the abovementioned multiple access method then shares the available transmission bandwidth between individual subscribers or connections. The multiple access method together with the subscriber-specific spreading codes define the physical channels, as mentioned.

In the time division duplex (TDD) mode and in the frequency division duplex (FDD) mode, a physical channel is therefore determined by the code sequence used or the spreading code used, a time slot and by the frequency channel. A distinction is generally made between so-called dedicated physical channels and common physical channels. A dedicated physical channel is utilized exclusively by one connection; it is allocated anew in the event of connection set up and, if appropriate, during the connections. Common physical channels are utilized simultaneously or alternately by a plurality of connections. System information items emitted by each base station are transmitted via common physical channels, for example, which each mobile station can receive. Furthermore, there are for example common physical channels which serve for packet data transmission. The use of a common physical channel always requires a separate addressing of transmitter and receiver.

In the TDD mode or FDD mode, physical channels are e.g. DPCH (Dedicated Physical Channel), CCPCH (Common Control Physical Channel) with P-CCPCH (Primary CCPCH) and S-CCPCH (Secondary CCPCH), PRACH (Physical Random Access Channel), PUSCH (Physical Uplink Shared Channel), PDSCH (Physical Downlink Shared Channel), PICH (Paging Indication Channel) and CPICH (Common Pilot Channel). The DPCH transmits useful and control data of a connection by means of dedicated physical channels. This channel exists on the uplink and the downlink. The CCPCH realizes broadcasting services in a cell on the downlink. The CCPCH is divided into a primary P-CCPCH and a secondary S-CCPCH subchannel. The P-CCPCH serves for broadcasting system information items within a cell. The S-CCPCH serves e.g. for realizing radio paging. The PRACH realizes random access and exists only on the uplink. The PUSCH is a common channel which can be utilized by different mobile stations. Both useful and control data are transmitted via it. The PDSCH is the counterpart to the PUSCH on the downlink. The PICH realizes radio paging and may replace one or more subchannels for radio paging on the S-CCPCH. The CPICH channel is used for channel estimation on account of its transmitted symbols that are known in the receiver.

In UMTS radio telecommunication systems, the base stations (node B) in each case supply coverage for one or more cells. The base stations process received radio signals from the mobile stations situated in their cells. This processing comprises, inter alia, error correction by means of channel coding, spreading and despreading according to the CDMA multiple access method and modulation and demodulation according to the QPSK modulation method.

The mobile stations (UE) are the counterparts to the base stations, the radio network controller (RNC) and the core network (CN). The mobile stations are responsible for the processing of the radio signal in the same way as the base stations. At the command of the radio access network (RAN), a mobile station must be able to adapt the transmission power. The mobile station supplies information about where it is currently situated to the core network. The negotiation about the quality of service required for a specific service and the mutual authentication also take place between the mobile station and the core network.

In the uplink mode, information items are transmitted from the mobile stations via a radio link to the base stations. The information items from different mobile stations are coded according to the CDMA multiple access method and transmitted in physical channels via a common frequency channel or radio channel. In the downlink mode, information items are transmitted from a base station to the mobile stations situated in the cell of the base station via a radio link. The information items of the base station are coded according to the CDMA multiple access method and are transmitted in physical channels to the respective mobile station. A plurality of physical channels are combined to form a radio signal which is received e.g. as transmission signal from those base stations with which the mobile stations are in a radio contact.

The base stations and the mobile stations of the UMTS radio telecommunication system in each case have dedicated data processing devices and at least one central data processing device. The dedicated data processing devices are interchange-connected among themselves and also the central data processing device.

In the case of the base stations and the mobile stations of the UMTS radio telecommunication system, the central data processing device is for example a digital signal processor (DSP) or a microprocessor in order to execute the computationally complicated functions of a communication protocol. The central data processing device programs the dedicated data processing devices for the execution of specific defined functions with the aid of internal locally present registers or memories such as random access memories (RAM), for example, which are provided for storing parameters. If the central data processing device additionally itself performs signal processing tasks or else only initiates signal processing tasks in various dedicated data processing devices, as well as the parameters it is also necessary to transmit data blocks between the central data processing device or the internal memories of the central data processing device and the dedicated data processing devices.

In the case of the UMTS radio telecommunication system, for example, the dedicated data processing devices have a RAKE receiver, a channel decoder and a transmission module. The dedicated data processing devices are intended to free the central data processing device of specific signal processing tasks and are therefore also referred to as hardware accelerators.

The mobile radio channel is characterized by multipath propagation (reflection, detraction, refraction, etc.) of the transmitted signals, time dispersion and Doppler distortion. A radio signal emitted by a transmitter can often reach a receiver on a plurality of different propagation paths that differ from one another by virtue of different propagation times, phase angles and intensities. In order to reconstruct the transmission signal from a reception signal that is composed of a superposition of signals transmitted on the different propagation paths, it is conditioned by means of a rake receiver. The RAKE receiver has fingers which are respectively assigned to a propagation path of a signal and are operated with a sampling delay that compensates for the propagation time delay of the corresponding propagation path. Each finger furthermore comprises a correlator which multiplies the time-delayed reception signal of a propagation path by a spreading code in order to recover bits from the reception signal that was spread using the same spreading code at the transmitter end. The output signals of the individual fingers are combined in order to improve the communication reliability and the communication behavior.

The channel decoder receives from the RAKE receiver a CDMA-decoded radio signal, which has been subjected to error protection coding using a convolutional code, for example, and has been transmitted via a radio channel exhibiting interference, and decodes said signal in accordance with the convolutional code. The channel decoder recovers the useful information items contained in the radio signal with the highest possible success rate, i.e. with the lowest possible bit error rate.

The transmission module carries out, for a signal to be transmitted, a channel coding using a linear block code or a convolutional code, for example, and shares the signal between physical channels by means of the CDMA multiple access method.

Controlling the data transmission in a data processing apparatus is difficult for the following reasons. The data packet sizes, the data rates and the data structures may be variable. Each data source may have a plurality of data channels. An individual data source may be divided into a plurality of data destinations. Moreover, the information items about the structure of the data and the temporal variation thereof in the data stream may be contained in the latter itself or in control channels transmitted in parallel with the incoming data.

In the case of the UMTS radio telecommunication system, the data transmission between the individual dedicated data processing devices and the central processing device is subjected to great fluctuations that are principally evident in the variable data rate via the radio interface. Given a constant chip rate on the radio transmission link, the bit rate of a subscriber signal that is represented in the chip stream is dependent only on the spreading factor of the respective subscriber-specific spreading code or the respective subscriber-specific code sequence since the chip rate is greater than the bit rate by the spreading factor. In this case, the spreading factor corresponds to the number of chips per bit. In order to be able to realize variable data rates, spreading codes of different lengths or with a different spreading factor are used. In the case of the UMTS radio telecommunication system, the data rate may fluctuate in a range between 32 kbit/s and 2 Mbit/s and is extremely dependent on the equipment class to be realized. For the data transmission between the dedicated data processing devices and the central data processing device and between the dedicated data processing devices among one another, this means that the required bus bandwidth is subjected to the same or at least comparable fluctuations and these fluctuations additionally have an effect on a small time base in the region of one time frame (10 ms). Therefore, data transmission methods have to be reprogrammed on this time base. In the case of the UMTS radio telecommunication systems there is additionally the need to demodulate the different physical channels (DPCH, DSCH, S-CCPCH, P-CCPCH) which have different data rates and are switched in or removed on the basis of time slots (1 time slot=$\frac{1}{15}$ time frame=666 µsec). Moreover, power measurements at different monitor cells are also additionally carried out at active cells. The results on account of the demodulation and also the power measurements have to be transmitted with transmission rates that fluctuate greatly on a small time base to the central data processing device or to other dedicated data processing devices.

In order to combat the difficulties of the variable data rates and data structures in the case of data processing apparatuses such as in the UMTS radio telecommunication system, it is known for the digital signal processor or a controller to move or transmit the data. For this purpose, the digital signal processor reads out status information items from the dedicated data processing devices or the peripheral elements or extracts said information items from data that have already been processed. If necessary, the digital signal processor assigns memories to the data and generates a data transmission parameter list in order to control the data transmission. The data transmission parameter list is used by the program code for a data transmission. If a data source, such as e.g. a dedicated data processing device, has data to be moved, it sends an interrupt to the digital signal processor. The interrupt or the program interruption effects a task switch in the digital signal processor. The execution of the program code for the data transmission is then begun and the first data transmission parameters of the data transmission parameter list are used in order to control the first data transmission.

One advantage of the data transmission by the digital signal processor consists in the associated simplicity of the data processing apparatus. One disadvantage consists in the fact that although the program code required for such a data transmission is generally simple, it may disadvantageously represent a considerable loading on the central data processing device. This is due, inter alia, to the time required to react to each interrupt, the determination and the checking of the addresses, and the time during which the digital signal processor often has to wait until the data have moved through an often complex bus system. The essential disadvantage of transmitting the data with the aid of the digital signal processor or the controller consists in the fact that the digital signal processor requires a great deal of time for transmitting the data and therefore has less time for processing the data and for other tasks. This is the case particularly when the data rate is high and varies and when the data flow changes frequently. One example of this is a base station of a UMTS radio telecommunication system, in the case of which an efficient task switch is desirable since the latter enables an individual digital signal processor to process a plurality of signal paths of a received signal (multipath propagation) and/or to control a plurality of mobile stations.

A second known possibility for combating the problem of the variable data rate and data structures in data processing systems consists in using a special device that carries out data transmissions between the data processing devices. Such a device is usually referred to as a data transmission device. A known data transmission device is e.g. a direct memory access (DAM) data transmission device, which transmits data via DMA data channels.

A simple data transmission device has a data transmission parameter register in order to control the data transmissions. More complicated data transmission devices have a list of data transmission parameters in a memory. In the case of UMTS radio telecommunication systems this data transmission parameter list is generated by the controller or the processor and loaded into a suitable memory position. If the data transmission parameter list is divided into blocks containing not only the data transmission parameters for a data transmission or a group of data transmissions but furthermore the address of a next block of data transmission parameters in a memory, then said list is referred to as a linked list. Consequently, a long sequence of data transmissions can be carried out by the data transmission device without the need for a further intervention by the digital signal processor. In the case of a DMA data channel, a counter is used as address generator instead of the digital signal processor. For initialization, an address register is loaded with a start address of a memory area to be read and the number of bytes to be transmitted is communicated to a counting register. The fact of whether the addresses are intended to be counted upward or downward and whether the memory being accessed is intended to be written to or read from is defined in a control register of the DMA data channel. The data transmission can be carried out in blocks and is effected without processing a program on the basis of a counting clock.

During the transmission of data, the digital signal processor firstly has to interrupt the current operation (task switch) and read and interpret the information items in the variations of the data flow. These information items have to be read from the data source, e.g. a dedicated data processing device such as a RAKE receiver, or be interpreted from the control information items in the data flow. The digital signal processor then has to calculate source addresses, destination addresses, the data block length and other data transmission parameters required for each transmission. Finally, the processor copies the data transmission parameters to the data transmission device and enables the transmission.

The advantage of using a data transmission device between data processing devices consists in the fact that the digital signal processor is not halted and is used to move data. By way of example, substantially higher data transmission speeds can be achieved with a DMA data channel than with a conventional interface. One disadvantage of using a data transmission device consists in the fact that the variable data rates and data structures can lead to severe temporal bottlenecks since the time required to carry out the steps described above limits the rate with which the data processing system can react to variations in the data flow. The digital signal processor must have sufficient power reserves to be able to react quickly enough and to be able, for example, to reprogram the DMA data channel. The time required on account of task switches, bridges between different bus systems and reprogramming of DMA channels in order to carry out the steps is not constant on account of variations in the bus load and since the digital signal processor has to carry out other important tasks at the same point in time. This makes it more difficult for the digital signal processor to synchronize the required changes in the data flow with the changes in the data transmission parameters for the data transmission device. The bus load on account of these steps reduces the bus capacity available for the required data flow.

A further known possibility for combating the problem of the variable data rates and data structures in data processing apparatuses consists in providing buffer areas in the dedicated data processing devices and a memory which are large enough to cope with the worst-case data flow and the worst-case data rate. If interrupts or data transmission requests are received, then the entire content of a buffer is transmitted between the data processing devices without the data transmission device knowing whether or not the buffer is filled. The data transmission device, i.e. the controller, the digital signal processor or the DMA data transmission device, has to manage separate source pointers, destination pointers and block length counters for each data channel, e.g. DMA data channel. The data destination, i.e. the memory, must be large enough to accommodate the real data and the dummy buffer areas.

The advantage of providing buffer areas in the dedicated data processing devices and a memory consists in the fact that the data processing apparatus and the control of the data transmission are constructed in a simple manner. Disadvantages are that a high transmission bandwidth is necessary since the maximum possible quantity of data is always transmitted, that an at least required bus frequency and bus word width must be ensured, that an additional memory space is required at the data source and the data destination, which is provided for dummy data blocks, and that the data have to be arranged to form contiguous data streams again in the destination.

A further known possibility for combating the problem of the variable data rate and data structures in data processing apparatuses consists in combining the data of a plurality of data packets or data buffers to form a larger data block for a transmission. This larger data block has to be decomposed after transmission. This procedure has the advantage that the data transmission is very simple. One disadvantage consists in the fact that the data for each data channel have to be arranged anew at the data destination and be combined to form contiguous data streams. The data streams have to be searched for control information items about the data structure. These information items have to be used in order to arrange the data for each data channel in contiguous data streams.

A further known possibility for combating the problem of the variable data rates and data structures in data processing apparatuses consists in setting up separate data transmission channels for each data channel or partial data channel in a dedicated data processing device. One advantage here consists in the fact that there is no need for additional subsequent processing since the data channels are directed to the correct data destinations. One disadvantage consists in the fact that the complexity of the data processing apparatus increases since each data channel and each partial data channel requires separate data transmission request signals, source pointers, destination pointers and block length counters. A further disadvantage consists in the fact that, in order to process the variable data rates, a memory block is required in the data destination for each data channel or partial data channel which can process the maximum possible data rate.

SUMMARY

The object of the present invention is to provide a simple data processing apparatus which can process variable data rates and variable data structures rapidly and flexibly.

This object is achieved by an arrangement according to the invention.

The idea on which the present invention is based consists in using a data transmission parameter list whose entries comprise a series of transmission tasks, the data transmission parameter list being generated by a dedicated data processing device itself. The invention provides a data processing apparatus having at least one dedicated data processing device of a first type; a central data processing device for controlling dedicated data processing devices; at least one data transmission channel for transmitting data between the data processing devices; and a data transmission device for transmitting data between the data processing devices via the at least one data transmission channel in a manner dependent on data transmission parameters, the data transmission parameters which are assigned to the at least one dedicated data processing device of the first type being generated by the at least one dedicated data processing device of the first type.

In accordance with one preferred development of the invention, the at least one dedicated data processing device of the first type has a local data memory.

In accordance with a further preferred development, the central data processing device has an internal data memory for storing data transmitted to the central data processing device by the dedicated data processing devices.

In accordance with a further preferred development, the size of the internal data memory of the central data processing device is a multiple of the size of the local data memory of the dedicated data processing device of the first type.

In accordance with a further preferred development, the internal data memory has memory areas having a size of one time slot, and the local data memory of the dedicated data processing device of the first type has memory areas having a size of 1/10 time slot.

In accordance with a further preferred development, the data processing apparatus furthermore has at least one dedicated data processing device of a second type, the data transmission parameters which are assigned to the at least one dedicated data processing device of the second type being generated by the central data processing device.

In accordance with a further preferred development, the data transmission parameters change rapidly in the case of the at least one dedicated data processing device of the first type, and the data transmission parameters change slowly in the case of the at least one dedicated data processing device of the second type. A time frame preferably serves as time reference to which it is possible to refer the temporal change with the attributes "rapidly" and "slowly".

In accordance with a further preferred development, the data processing apparatus furthermore has a central data transmission parameter memory for storing data transmission parameters.

In accordance with a further preferred development, the at least one dedicated data processing device of the first type has a local data transmission parameter memory for storing the data transmission parameters.

In accordance with a further preferred development, the local data memory and the local data transmission parameter memory of the at least one dedicated data processing device of the first type, the internal data memory of the central data processing device and the central data transmission parameter memory have normal memory elements and shadow memory elements.

In accordance with a further preferred development, the central data processing device has a digital signal processor.

In accordance with a further preferred development, the at least one dedicated data processing device of the first type has a RAKE receiver.

In accordance with a further preferred development, the at least one dedicated data processing device of the second type has a channel decoder and a transmission module.

In accordance with a further preferred development, the data transmission device is a direct memory access (DMA) data transmission device and the at least one data transmission channel is a DMA channel.

In accordance with a further preferred development, the data transmission parameters have a quantity of data, a source address and a destination address of the data moved.

One advantage of the present invention consists in the fact that a controller or a central data processing device, such as e.g. a digital signal processor, does not have to monitor the dynamic variations of the data flow and does not have to reconfigure a data transmission apparatus before the data flow changes. This is due to the fact that the dedicated data processing devices know the changing data structures and data rates and control the data transmissions by generation and transmission of a data transmission parameter list to a data transmission device. An extremely high flexibility is achieved since a wide variety of dedicated data processing devices themselves implement the entries of the linked data transmission parameter list and, consequently, the different dedicated data processing devices and also the different requirements made of the data transmission are decoupled for example by means of a data transmission parameter list memory. It is thus possible to give attention to points of individual requirements of a plurality of dedicated data processing devices without having to take account of these requirements in the implementation of a data transmission device, e.g. a DMA data transmission device, or having to fulfill these requirements by means of a central data processing device, such as e.g. a digital signal processor. Fulfilling these requirements by means of a data transmission device prevents reusability and increases the design and verification outlay. On the other hand, fulfilling the requirements by means of a central data processing device would counteract the original approach of relieving the loading on a central data processing device through a data transmission device and thus lead to a reduction of the system efficiency.

A further advantage of the present invention consists in the fact that the controller or the central data processing device does not have to carry out frequent task switches in order to monitor and control the data flow. There is therefore a reduced load on the bus system.

A further advantage of the present invention consists in the fact that a data transmission device can be reprogrammed very rapidly in order to cope with complex changes in the data flow, and can be used instead of a more complex system.

A further advantage of the present invention consists in the fact that, as a result of using a data transmission parameter list, only the area currently written to is transmitted and bandwidth is thus saved. This is noticeable in particular if different data channels having different spreading factors are demodulated in a RAKE receiver, for example, so that a symbol buffer with a small spreading factor has to be transmitted completely and other symbol buffers with a high spreading factor only have to be partly transmitted.

BRIEF DESCRIPTION OF THE DRAWINGS

Preferred exemplary embodiments of the present invention are explained in more detail below with reference to the accompanying drawings, in which.

In the figures, identical reference symbols designate identical or functionally identical component parts.

Figure 1:
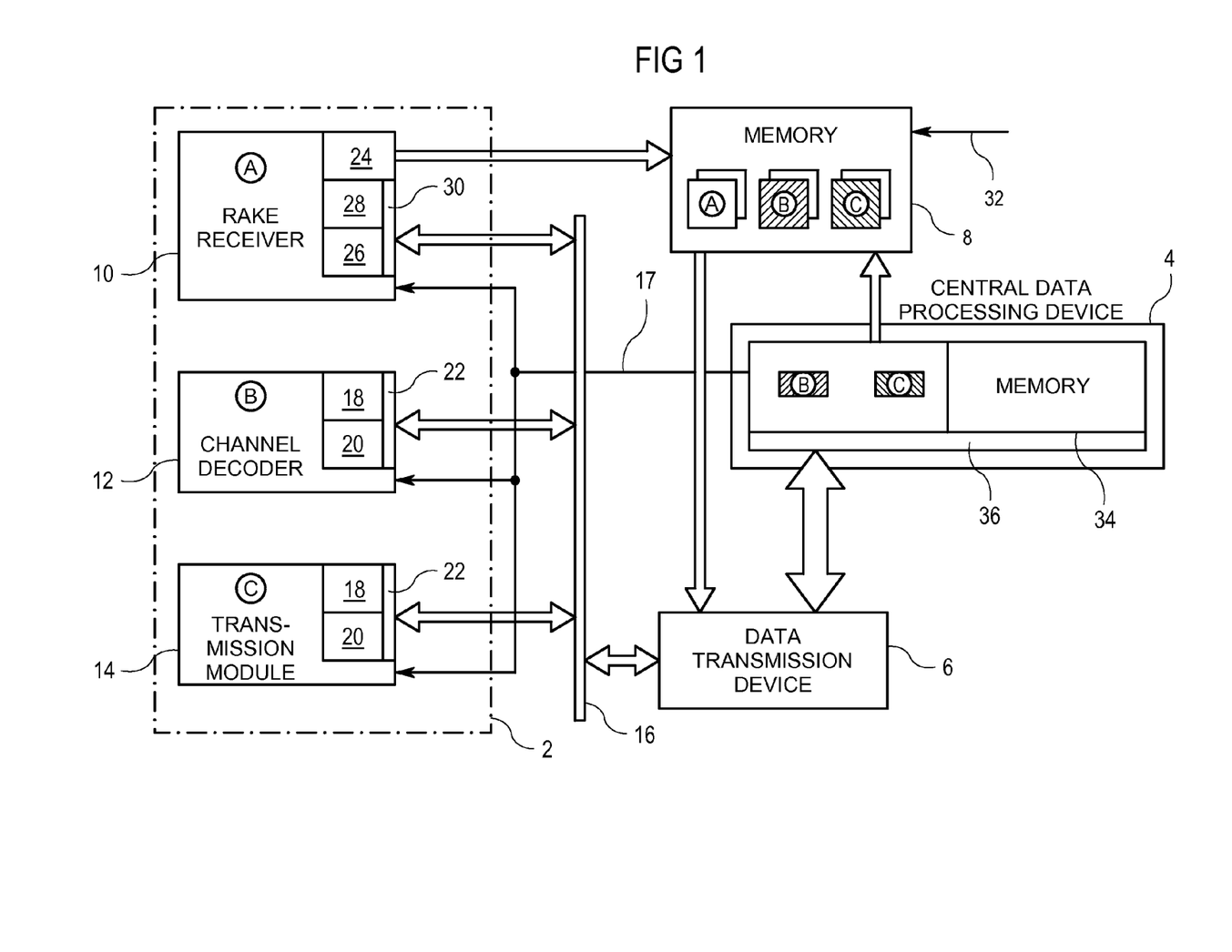
FIG. 1 shows an exemplary embodiment of a data processing apparatus according to the invention.

FIG. 1 shows an exemplary embodiment of a data processing apparatus according to the invention. The data processing apparatus has dedicated data processing devices 2, a central data processing device 4, a data transmission device 6 and a memory 8 for data transmission parameters or a data transmission parameter list. The data processing apparatus is preferably used in components of a UMTS radio telecommunication system, such as e.g. mobile stations and base stations. The dedicated data processing devices 2 are preferably UMTS peripheral elements, i.e. a RAKE receiver 10, a channel decoder 12 and a transmission module 14. The central data processing device 4 is preferably a digital signal processor, but may alternatively be a microprocessor or some other arbitrary central data processing device. The data transmission device 6 is preferably a DMA data transmission device, and the memory 8 is preferably a random access memory (RAM).

The dedicated data processing devices 2 are connected, by means of a bus 16, among one another and to the data transmission device 6 for the bidirectional transmission of data. The RAKE receiver 10 is directly connected to the memory 8 for the transmission of data transmission parameters ((A)) of the RAKE receiver 10 to the memory 8. The central data processing device 4 is connected to the memory 8 in order to transmit data transmission parameters ((B), (C)), which are generated by the central data processing device 4 for the channel decoder 12 and the transmission module 14, to the memory 8. The memory 8 is connected to the data transmission device 6 for the transmission of all the data transmission parameters of the dedicated data processing devices 2 to the data transmission device 6. The central data processing device 4 is connected to the data transmission device 6 for the bidirectional transmission of data from the dedicated data processing devices 2 via the bus 16 or from the central data processing device 4 via the data transmission device 6 and the bus 16 to the dedicated data processing devices 2. The central data processing device 4 is connected via control lines 17 to the dedicated data processing devices 2 in order to program the dedicated data processing devices.

The RAKE receiver 10 serves for recovering a transmission signal from a received radio signal composed of a superposition of signals transmitted on different propagation paths. For this purpose, the RAKE receiver 10 has fingers that are respectively assigned to a propagation path of a signal. The channel decoder 12 receives from the RAKE receiver 10 a CDMA-decoded radio signal, e.g. a radio signal that has been subjected to error protection coding using a convolutional code and has been transmitted via a radio channel exhibiting interference, and decodes said radio signal in accordance with the error protection code. The channel decoder 12 serves for recovering the useful information items contained in the radio signal with the highest possible success rate, i.e. a low bit error rate. The transmission module 14 carries out a channel coding using a convolutional code, by way of example, for a signal to be transmitted and shares the signal between physical channels by means of the CDMA multiple access method.

The central data processing device 4 serves for signal processing and for control of the data processing apparatus. The central data processing device 4 receives data to be processed from the various dedicated data processing devices 2 via the bus 16 and the data transmission device 6, for example, carries out within itself a processing of these data and forwards the latter via the data transmission device 6 and the bus 16 to a corresponding dedicated data processing device.

The memory 8 for the data transmission parameter list preferably has a data transmission parameter list or linked list whose order of magnitude lies in the tens range. Each entry in the data transmission parameter list initiates, with the aid of a data transmission request signal (not shown) to the data transmission device 6 a data transmission between, by way of example, a dedicated data processing device 2 and the central data processing device 4. For this purpose, each entry has a source address, a number of data words to be transmitted and a destination address. The data are transmitted between the source address and the destination address. The entries in the data transmission parameter list or the data transmission parameters are stored at a location at which they can be used directly by the data transmission device 6 in order to control the data flow. For this purpose, the memory 8 is preferably a global memory module, which is essentially a memory device containing the entries in the data transmission parameter list to which the data transmission device 6 has access. In the case of the invention, shadow memory elements are preferably provided in the memory 8 if the data transmission parameters have to be reprogrammed during a data transmission.

The data transmission device 6 receives the data transmission parameters in the data transmission parameter list from the memory 8 in a form that can be used directly by it without any further conversion. The data transmission device 6 has access to the memory 8 and is permanently activated, but is passive if no data transmission request signal is activated from a respective dedicated data processing device 2. Before each data transmission via the bus 16, the data transmission parameter list is read by the data transmission device 6 and the various data transmission tasks are checked. The data are then transmitted in accordance with the entries in the data transmission parameter list. As soon as a transmission task has ended, the next entry in the data transmission parameter list is executed.

In the case of the exemplary embodiment shown in FIG. 1, the data transmission parameters in the data transmission parameter list are generated by the RAKE receiver 10 itself for the RAKE receiver 10 and by the central data processing device 4 for the channel decoder 12 and the transmission module 14. In general, the dedicated data processing devices 2 can themselves generate the data transmission parameters in the data transmission parameter list and make entries in the memory 8 or make them available under a special address in an address space. The entries in the data transmission parameter list may alternatively be generated by the central data processing device 4 and be programmed into the memory 8. However, the generation of the data transmission parameters by the central data processing device 4 is expedient only when the data transmission parameters only change on a large time base. This is the case with a UMTS radio telecommunication system, for example, for the channel decoder 12 and the transmission module 14 shown in FIG. 1. Here the transmission rates change at a block level, time frame level or even TTI level (TTI=transmission time interval; up to 8 time frames). By contrast, the transmission information items change at a time slot level or even at a sub-time slot (sub-slot) level in the case of time-critical dedicated data processing devices such as the RAKE receiver 10. Programming of a data transmission parameter list by means of the central data processing device 4 is not expedient here.

The channel decoder 12 and the transmission module 14 in each case have an input buffer 18 and an output buffer 20, which are connected to the data bus 16 via an interface 22. The input buffer 18 receives data arriving via the bus 16, while the output buffer 20 outputs data to the bus 16. The interface 22 serves for connection and synchronization of the respective input buffer 18 and of the respective output buffer 20 to/with the bus 16.

The RAKE receiver 10 has a data transmission parameter buffer 24 for buffer-storing the data transmission parameters generated by the RAKE receiver 10. The data transmission parameters are forwarded to the memory 8 via the data transmission parameter buffer 24. The RAKE receiver 10 furthermore has an operating parameter buffer 26 for storing operating parameters of the RAKE receiver 10 and a symbol buffer 28, which are connected to the bus 16 via an interface 30. The symbol buffer 28 serves for buffer-storing the symbols or data of physical channels. For this purpose, the symbol buffer 28 preferably has partial symbol buffers for buffer-storing the symbols of the individual physical channels. On account of the greatly fluctuating data transmission rate, in the case of the present invention, in the case of UMTS radio telecommunication systems, partial symbol buffers of identical size are preferably provided for all the physical channels, which are only rarely filled uniformly, however, and are transmitted. Consequently, a different number of data words, listed as different entries in the data transmission parameter list, are transmitted from each partial symbol buffer. The RAKE receiver 10, which has been programmed once by the central data processing device 4, itself determines the number of data in the partial symbol buffers of the symbol buffer 28 which are to be transmitted to the central data processing device 4. The source address is given by an offset address of the symbol buffer 28. The destination address is defined once as an offset value by the central data processing device 4 and then incremented with each data word transmitted until an offset value is transmitted again by the central data processing device 4.

The central data processing device 4 has an internal memory 34, in which the symbols and intermediate results of the signal processing that are transmitted by the dedicated data processing devices 2 can be stored. The central data processing device 4 is connected to the data transmission device 6 via an interface 36. The memory 8 furthermore has an input for a clock signal 32, which controls the transmission of the data transmission parameters from the RAKE receiver and the central data processing device 4 and to the data transmission device 6.

Figure 2:
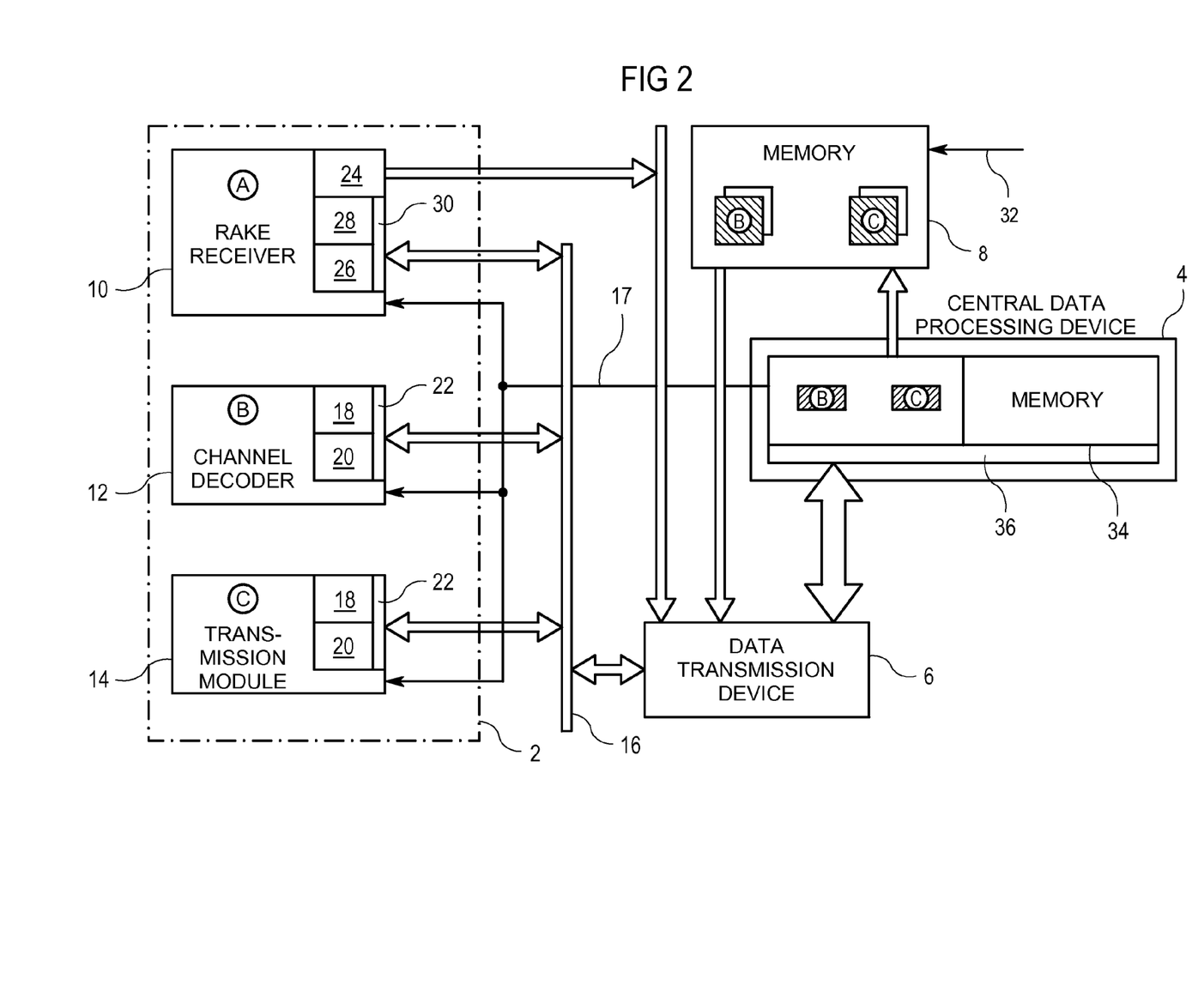
FIG. 2 shows a further exemplary embodiment of a data processing apparatus according to the invention.

FIG. 2 shows a further exemplary embodiment of a data processing apparatus according to the invention. Here the RAKE receiver 10 is connected directly to the data transmission device 6 via the data transmission parameter buffer 24. The RAKE receiver 10 generates the data transmission parameters ((A)) assigned thereto itself and stores them in the data transmission parameter buffer 24 until they are called up by the data transmission device 6. In contrast to the exemplary embodiment of FIG. 1, the data transmission parameters of the RAKE receiver 10 are therefore transmitted directly to the data transmission device 6 and are not stored in the memory 8 together with the data transmission parameters ((B), (C)) of the channel decoder 12 and of the transmission module 14.

Figure 3:
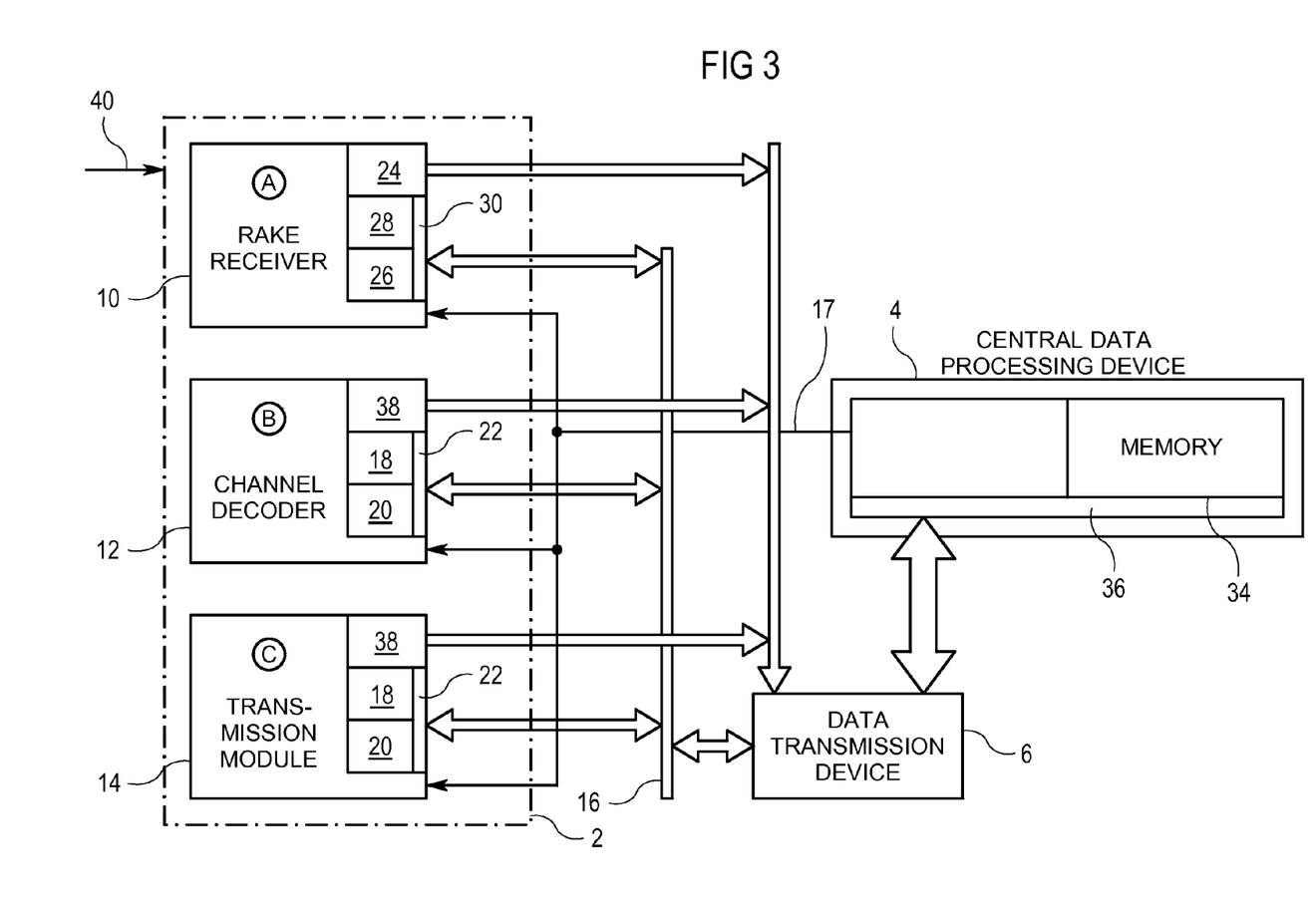
FIG. 3 shows a further exemplary embodiment of a data processing apparatus according to the invention.

FIG. 3 shows a further exemplary embodiment of a data processing apparatus. In comparison with the exemplary embodiment of FIG. 2, in the case of this exemplary embodiment, the data transmission parameters of the channel decoder 12 and of the transmission module 14 are likewise generated by the latter themselves and buffer-stored locally in data transmission parameter buffers 38 in order to be transmitted directly to the data transmission device 6. Therefore, the data transmission parameters are not generated by the central data processing device, and a memory for data transmission parameters is furthermore not provided. The RAKE receiver 10, the channel decoder 12 and the transmission module 14 are temporally controlled by means of a common clock signal 40 fed to the dedicated data processing devices 2.

In general, in the case of the present invention, the data transmission parameters which are stored in the memory 8 in FIGS. 1 and 2 may be stored at an arbitrary location in an address space of the data processing apparatus. Therefore, the data transmission parameters may also be stored, for one dedicated data processing device, in the dedicated data processing device itself and, for other dedicated data processing devices, at a central location in a memory.

The exemplary embodiments of FIGS. 1 and 2 are particularly advantageous since the data transmission parameters are directly generated only by dedicated data processing devices, such as the RAKE receiver, which have time-critical and extremely variable data transmission parameters, the data transmission parameters being programmed by the central data processing device 4 in the case of the rest of the data processing devices.

It should be noted that the memories and buffers used in the case of the present invention preferably have random access memories (RAM).

In the case of the present invention, two symbol buffers whose content has to be transmitted to the central data processing device 4 are preferably provided in the symbol buffer 28 of the RAKE receiver 10. The two symbol buffers differ by virtue of the nature of the data types to be stored and the required data transmission rate.

Firstly a symbol buffer which is referred to as a multicode (MC) symbol buffer and stores the results of the data demodulation of a multicode finger and secondly a dual code symbol buffer, which is referred to as a dual code (DC) symbol buffer and stores the results of the demodulation of a dual code finger, are provided in the symbol buffer 24 of the RAKE receiver.

Figure 4:
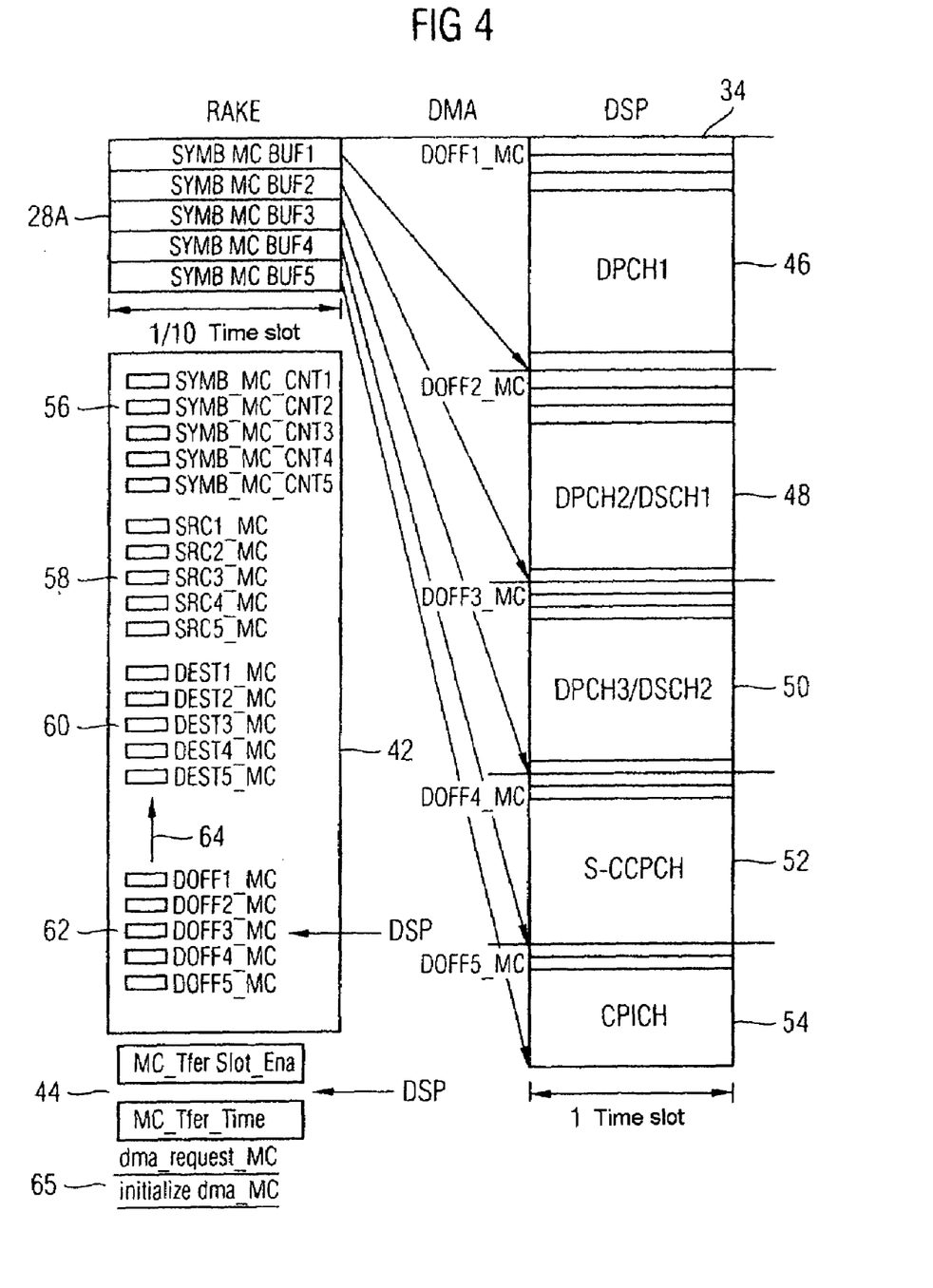
FIG. 4 shows the transmission of symbols between a RAKE receiver and a digital signal processor in the case of multicode fingers.

FIG. 4 schematically shows for the exemplary embodiment of FIG. 2 the transmission of symbols from a multicode symbol buffer 28A of the RAKE receiver 10 (FIG. 2) to the internal memory 34 of the digital signal processor (DSP) with the aid of DMA transmissions of a DMA transmission device. The RAKE receiver has control registers 42 in addition to the multicode symbol buffer 28A and is controlled by control and time stamp bits 44 from the digital signal processor. The multicode symbol buffer 28A contains five different partial symbol buffers or memory areas SYMB_MC_BUF1, . . . ,5. The size of the different partial symbol buffers is preferably oriented toward storing symbols having a length of 1/10 time slot and a spreading factor (SF) of 4 or 256 of the relevant data or control channels.

Table 1 shows the assignment of physical channels to the partial symbol buffers and the content of the partial symbol buffers.

TABLE 1

| Partial symbol buffer | Physical channel | Content |
|---|---|---|
| SYMB_MC_BUF1 | DPCH1 | Buffer size: 1 DPCH channel with 64 symbols (1/10 time slot for SF = 4): each I, Q with 2 × 8 bits |
| SYMB_MC_BUF2 | DPCH2/DSCH1 | Buffer size: 1 DPCH/DSCH channel with 64 symbols (1/10 time slot for SF = 4): each I, Q with 2 × 8 bits |
| SYMB_MC_BUF3 | DPCH3/DSCH2 | Buffer size: 1 DPCH/DSCH channel with 64 symbols (1/10 time slot for SF = 4): each I, Q with 2 × 8 bits |
| SYMB_MC_BUF4 | S-CCPCH | Buffer size: 1 S-CCPCH channel with 64 symbols (1/10 time slot for SF = 4): each I, Q with 2 × 8 bits |
| SYMB_MC_BUF5 | CPICH | Buffer size: 6 symbols (one symbol for a cell of an active set, 1/10 time slot for SF = 256): each I, Q with 2 × 8 bits |

The partial symbol buffers SYMB_MC-BUF1, . . . , 3 of the physical channels DPCH1, DPCH2/DSCH1, DPCH3/DSCH2 have in each case a size of 64 symbols or entries (2×8 bits (I, Q)) given a spreading factor (SF) of 4. The partial symbol buffer SYMB_MC_BUF4 of the physical channel S-CCPCH likewise has 64 symbols (2×8 bits (I, Q)). The physical channel CPICH has a size of 6 symbols, i.e. one symbol (2×8 bits (I, Q)) for each cell given six active cells. This is due to the fact that, in the case of an SSDT (=site-selection diversity transmission) power control mode of a UMTS radio telecommunication system, the mobile station decides about the transfer of the connection between base stations of the active set on the basis of the cell-related CPICH power. Therefore, the integrated CPICH symbols have to be transmitted via all the propagation paths of a cell.

The internal memory 34 of the digital signal processor serves for receiving symbols of a complete time slot. The symbols are moved from the multicode symbol buffer 28A to the internal memory 34 of the digital signal processor by DMA transmissions. Within the internal memory 34, the symbols in channel-assigned areas 46 to 54 are linked seamlessly to form a complete time slot during successive DMA transmissions of the DMA data transmission device which have a size of 1/10 time slot. The internal memory 34 within the digital signal processor therefore has a size of 10×(size of the multicode symbol buffer) since the digital signal processor, in contrast to the RAKE receiver, processes the transmitted data in time slots.

The control registers 42 serve for controlling the DMA transmissions. The control registers 42 determine the data transmission parameter list or the linked list for the data transmission. The control registers specify the content of the partial symbol buffers of the multicode symbol buffer 28A and have counter registers 56, source address registers 58, destination address registers 60 and offset registers 62.

The source address registers 58 serve for storing source addresses SRC1_MC, ..., SRC5_MC within the partial symbol buffers of the multicode symbol buffer 28A, which are start addresses of partial symbol buffers at the beginning of the transmission or addresses within the partial symbol buffers during the transmission. The destination address registers 60 serve for storing destination addresses DEST1_MC, ..., DEST5_MC within the internal memory 34 of the digital signal processor. The offset registers 62 serve for storing start addresses DOFF1_MC, ..., DOFF5_MC of the channel-assigned areas 46 to 54 at the beginning of the transmission at a time slot boundary. The counter registers 56 SYMB_MC_CNT1, ..., 5 serve for determining how many entries within the partial symbol buffers SYMB_MC_BUF1 ..., 5 are valid. Only the content of the valid memory cells of the partial symbol buffers is transmitted to the internal memory of the digital signal processor by the DMA data transmission device.

The counter registers SYMB_MC-CNT1, ..., 5 are assigned to the individual partial symbol buffers SYMB_MC_BUF1, ..., 5. Table 2 shows the assignment of the counter registers SYMB_MC_CNT 1, ..., 5 to the partial symbol buffers SYMB_MC_BUF 1, ..., 5.

TABLE 2

| Partial symbol buffer | Assigned counter register |
| --- | --- |
| SYMB_MC_BUF1 | SYMB_MC_CNT1 |
| SYMB_MC_BUF2 | SYMB_MC_CNT2 |
| SYMB_MC_BUF3 | SYMB_MC_CNT3 |
| SYMB_MC_BUF4 | SYMB_MC_CNT4 |
| SYMB_MC_BUF5 | SYMB_MC_CNT5 |

The counting registers specify a number specifying the quantity of data words of a partial symbol buffer of the multicode symbol buffer 28A that is intended to be transmitted by the DMA data transmission device. After transmitting the content of one partial symbol buffer, the DMA data transmission device continues to the next partial symbol buffer. The channel-assigned areas 46 to 54 in the memory 34 of the digital signal processor are specified by the offset addresses DOFF1_MC, ..., DOFF5_MC of the offset registers 62, which are determined by the digital signal processor. At the start of a time slot, said addresses are loaded into the destination registers 60 for the destination addresses DEST1_MC, ... DEST5_MC, as is shown by an arrow 64. The content of said destination registers 60 is incremented for each transmitted data word. The content of the destination registers 60 is retained for the next DMA transmission operation, which is triggered by a partial symbol buffer overflow or a time stamp of a specified transmission to the digital signal processor. The source registers 58 are likewise incremented for each word transmitted, with the exception that the content is not retained for the next DMA transmission operation since the transmission always begins at the start address of a partial symbol buffer.

Before a DMA transmission operation can be established, the control registers 42 described above have to be loaded as a data transmission parameter list or linked list. Two control signals 65 are generated by the RAKE receiver in order to control the DMA transmission:

a) the data transmission request signal DMA_REQUEST_MC, which halts or continues the DMA transmission based on the availability of the data; and b) a signal initialize_DMA_MC, which contains information items for the DMA transmission operation in order to load the control registers as a data transmission parameter list for the next DMA transmission.

The connection between the RAKE receiver and the digital signal processor is managed in the following manner. The multicode symbol buffer 28A is realized twice as multicode symbol buffer and as shadow multicode symbol buffer. One of these multicode symbol buffers is written to by the RAKE receiver, while the other multicode symbol buffer is read by the DMA data transmission device. The exchange of data is initiated by three different methods.

a) As soon as a partial symbol buffer, e.g. the partial symbol buffer of the physical channel DPCH1, has been completely written to by the RAKE receiver, the roles of the multicode symbol buffer and of the shadow multicode symbol buffer are interchanged.

b) The roles of the two buffers are likewise interchanged as standard at the time slot boundary. The digital signal processor has to activate this operating mode by means of the control bit MC_Tfer_Slot_Ena.

c) The digital signal processor may additionally generate the time stamp bit MC_Tfer_Time, which relates to a main counter and determines when the data are intended to be transmitted to the digital signal processor.

The abovementioned dual code symbol buffer contains results of the demodulation of the physical channel P-CCPCH of a monitor cell or a cell of an active set, results of the demodulation of the physical channel S-CCPCH of the reference cell in the idle mode, results of power measurements, results of encryption code identification methods and results of noise measurements.

Figure 5:
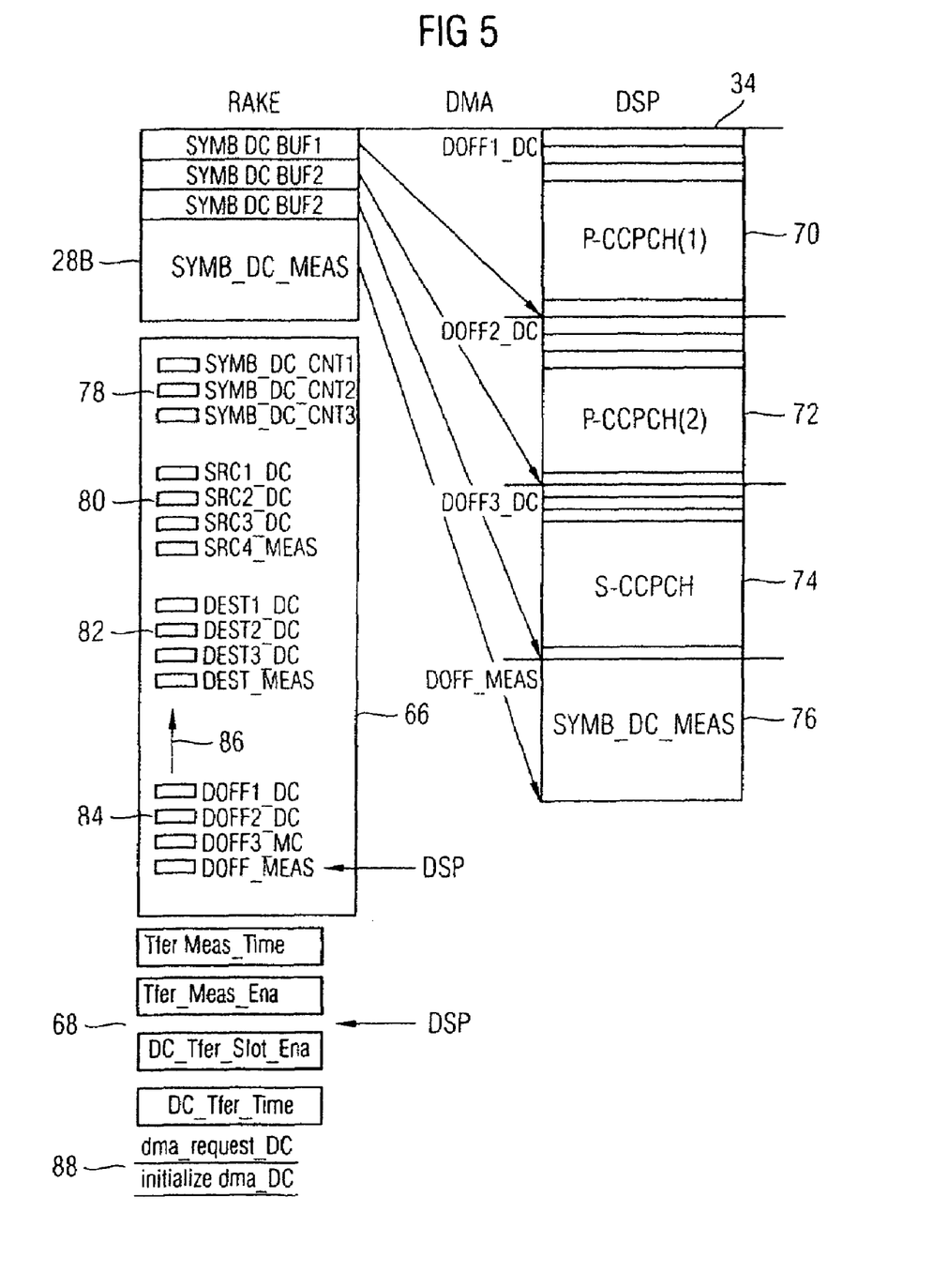
FIG. 5 shows the transmission of symbols between a RAKE receiver and a digital signal processor in the case of dual code fingers.

FIG. 5 schematically shows for the exemplary embodiment of FIG. 2 the transmission of symbols from a dual code symbol buffer 28B of the RAKE receiver 10 to the internal memory 34 of the digital signal processor (DSP) with the aid of DMA transmissions of the DMA transmission device. The RAKE receiver has control registers 66 in addition to the dual code symbol buffer 28B and is controlled by control and time stamp bits 68 from the digital signal processor.

The dual code symbol buffer 28B has four different memory areas or partial symbol buffers SYMB_DC_BUF1, ..., 3 and SYMB_DC_MEAS. The first and second partial symbol buffers SYMB_DC_BUF1, 2 store results of the demodulation of the physical channel P-CCPCH from two cells (in each case 10 symbols, symbols of an entire time slot, 2×8 bits (I, Q)). The third partial symbol buffer SYMB_DC_BUF3 stores results of a demodulation of the physical channel S-CCPCH of a reference cell in the idle mode (64 symbols, 1/10 time slot with SF=4, 2×8 bits (I, Q)). The fourth partial symbol buffer SYMB_DC_MEAS stores results of power measurements, results of noise measurements and results of the encryption code identification method. The fourth partial symbol buffer SYMB_DC_MEAS is large enough to store all the different measurement results of the dual code fingers of an entire time frame. Said fourth partial symbol buffer contains memory cells for measurement results which are allocated to each finger number of a RAKE receiver, each component and each task. It should be noted that the fourth partial symbol buffer is not specified by the respective task (measurement, noise measurement, encryption code identification), but rather by the finger identity.

Table 3 shows the assignment of the physical channels to the partial symbol buffers and the content of the partial symbol buffers.

TABLE 3

| Partial symbol buffer | Physical channel | Content |
|---|---|---|
| SYMB_DC_BUF1 | P-CCPCH(1) | Buffer size: physical channel P-CCPCH with 10 symbols (1 time slot): I, Q with 2 × 8 bits |
| SYMB_DC_BUF2 | P-CCPCH(2) | Buffer size: physical channel P-CCPCH with 10 symbols (one time slot): I, Q with 2 × 8 bits |
| SYMB_DC_BUF3 | S-CCPCH(3) | Buffer size: physical channel S-CCPCH with 64 symbols (1/10 time slot for SF = 4): each I, Q with 2 × 8 bits |
| SYMB_DC_MEAS | Measurements | Buffer size: number of dual code fingers × number of code components × number of tasks × 16 bits |

The internal memory 34 has channel-assigned areas 70 to 76. The channel-assigned area 70 is assigned to the physical channel P-CCPCH (1) of the first cell and has a size of one time frame, the channel-assigned area 72 is assigned to the physical channel P-CCPCH (2) of the second cell and has a size of one time frame, the channel-assigned area 74 is assigned to the physical channel S-CCPCH and has a size of one time slot, and the area 76 is assigned to the measurement area SYMB_DC_MEAS and has a size of 256 symbols. Within the internal memory 34, the symbols within the channel-assigned areas 70, 72 and 74 are linked seamlessly to form a complete time frame or time slot during successive DMA transmissions of the DMA data transmission device which have the size of one time slot or of 1/10 time slot.

The control registers 66 serve for controlling the DMA transmissions. The control registers 66 determine the data transmission parameter list or the linked list for the data transmission. The control registers specify the content of the partial symbol buffers of the dual code symbol buffer and have counter registers 78, source address registers 80, destination address registers 82 and offset registers 84.

The source address registers 80 serve for storing source addresses SRC1_DC, . . . , SRC3_DC and SRC_MEAS within the partial symbol buffers of the dual code symbol buffer 28B, which are start addresses of partial symbol buffers at the beginning of the transmission or addresses within the partial symbol buffers during the transmission. The destination address registers 82 serve for storing destination addresses DEST1_DC, . . . , DEST3_DC, DEST_MEAS within the internal memory 34 of the digital signal processor. The offset registers 84 serve for storing start addresses 64 DOFF1_DC, . . . , DOFF3_DC and DOFF_MEAS of the channel-assigned areas 70 to 76 at the beginning of the transmission at a time frame boundary, a time slot boundary or at the beginning of the transmission of the partial symbol buffer SYMB_DC_MEAS. The counter registers 78 SYMB_DC_CNT1, . . . , 3 serve for determining how many entries within the partial symbol buffers SYMB_DC_BUF1, . . . , 3 are valid. Only the content of the valid memory cells of the partial symbol buffers 28B is transmitted to the internal memory 34 of the digital signal processor by the DMA data transmission device.

The counter registers SYMB_DC_CNT1, . . . , 3 are assigned to the individual partial symbol buffers SYMB_DC_BUF1, . . . , 3. Table 4 shows the assignment of the counter registers SYMB_DC_CNT1, . . . , 3 to the partial symbol buffers SYMB_DC_BUF1, . . . , 3.

TABLE 4

| Partial symbol buffer | Assigned counter register |
|---|---|
| SYMB_DC_BUF1 | SYMB_DC_CNT1 |
| SYMB_DC_BUF2 | SYMB_DC_CNT2 |
| SYMB_DC_BUF3 | SYMB_DC_CNT3 |

In the case of the fourth partial symbol buffer SYMB_DC_MEAS, the specification of a counter register is pointless since the partial symbol buffer is not filled linearly. In the normal case, different memory cells are supplied in an arbitrary order with data in accordance with the programming of different fingers of the RAKE receiver, components and tasks.

By contrast, the counter registers SYMB_DC_CNT1, . . . , 3 specify a number specifying the quantity of data words of a partial symbol buffer of the dual code symbol buffer 28B that is intended to be transmitted by the DMA data transmission device. After transmitting the content of one partial symbol buffer, the DMA data transmission device continues to the next partial symbol buffer. The channel-assigned areas 70 to 76 in the internal memory 34 of the digital signal processor are specified by the offset addresses DOFF1_DC, . . . , DOFF3_DC, a beginning of a transmission of the partial symbol buffer SYMB_DC_MEAS of the offset registers 84, which are determined by the digital signal processor. At the start of a time frame or time slot, said addresses are loaded into the destination registers 82 for the destination addresses DEST1_DC, . . . DEST3_DC and DEST_MEAS, as is shown by an arrow 86. The content of said destination registers 82 is incremented for each transmitted data word. The content of the destination registers 82 is retained for the next DMA transmission operation, which is triggered by a partial symbol buffer overflow, beginning of a transmission of the partial symbol buffer SYMB_DC_MEAS or a time stamp of a specified transmission to the digital signal processor. The source registers 80 are likewise incremented for each word transmitted, with the exception that the content is not retained for the next DMA transmission operation since the transmission always begins at the start address of a partial symbol buffer.

Before a DMA transmission operation can be established, the control registers 66 described above have to be loaded as a data transmission parameter list or linked list. Two control signals 88 are generated by the RAKE receiver in order to control the DMA transmission:

a) the data transmission request signal DMA_REQUEST_DC, which halts or continues the DMA transmission based on the availability of the data; and b) a signal initialize_DMA_DC, which contains information items for the DMA transmission operation in order to load the control registers as a data transmission parameter list for the next DMA transmission.

The connection between the RAKE receiver and the digital signal processor is managed in the following manner. The dual code (DC) symbol buffer 28B is realized twice as dual code symbol buffer and as shadow dualcode symbol buffer. One of these buffers is written to by the RAKE receiver, while the other buffer is read by the DMA data transmission device. The exchange of data of the partial symbol buffers SYMB_DC_BUF1, . . . , 3 is initiated by three different methods.

a) As soon as a partial symbol buffer, e.g. the partial symbol buffer SYMB_DC_BUF3 for the physical channel S-CCPCH, has been completely written to by the RAKE receiver, the roles of the dual code symbol buffer and of the shadow dual code symbol buffer are interchanged.

b) The roles of the two buffers are likewise interchanged as standard at the time slot boundary. The digital signal processor has to activate this operating mode by means of the control bit DC_Tfer_Slot_Ena.

c) The digital signal processor may additionally program the time stamp bit DC_Tfer_Time, which relates to the main counter, if the data are intended to be transmitted to the digital signal processor.

The content of the fourth partial symbol buffer SYMB_DC_MEAS is separated and transmitted only when the transmission is activated by the start bit Tfer_Meas_Ena in the case of the specified time stamp bit Tfer_Meas_Time.

| List of reference symbols | |
|---|---|
| 2 | Dedicated data processing devices |
| 4 | Central data processing device |
| 6 | Data transmission device |
| 8 | Memory |
| 10 | RAKE receiver |
| 12 | Channel coder |
| 14 | Transmission module |
| 16 | Bus |
| 17 | Control lines |
| 18 | Input buffer |
| 20 | Output buffer |
| 22 | Interface |
| 24 | Data transmission parameter buffer |
| 26 | Operating parameter buffer |
| 28 | Symbol buffer |
| 28A | Multicode symbol buffer |
| 28B | Dual code symbol buffer |
| 30 | Interface |
| 32 | Clock signal |
| 34 | Internal memory |
| 35 | Destination address register |
| 36 | Interface |
| 38 | Data transmission parameter buffer |
| 40 | Clock signal |
| 42 | Control register |
| 44 | Control and time stamp bits |
| 46 | Channel-assigned area |
| 48 | Channel-assigned area |
| 50 | Channel-assigned area |
| 52 | Channel-assigned area |
| 54 | Channel-assigned area |
| 56 | Counter register |
| 58 | Source address register |
| 60 | Destination address register |
| 62 | Offset register |
| 64 | Arrow |
| 65 | Control signals |
| 66 | Control register |
| 68 | Control and time stamp bits |
| 70 | Channel-assigned area |
| 72 | Channel-assigned area |
| 74 | Channel-assigned area |
| 76 | Channel-assigned area |
| 78 | Counter register |
| 80 | Source address register |

-continued

| List of reference symbols | |
|---|---|
| 82 | Destination address register |
| 84 | Offset register |
| 86 | Arrow |
| 88 | Control signals |

The invention claimed is:

1. A data processing apparatus for use in a component of a universal mobile telecommunications system (UMTS) having:
a plurality of data processing devices comprising UMTS peripheral elements, the plurality of data processing devices including a central data processing device and a set of dedicated data processing devices, the set of dedicated data processing devices including a first dedicated data processing device of a first type the central data processing device configured to provide control signals to at least one of the set of dedicated data processing devices;
at least one data transmission channel configured to provide data transmission between the plurality of data processing devices; and
a data transmission device configured to cause the transmission of data between the plurality of data processing devices via the at least one data transmission channel in a manner dependent on data transmission parameters, wherein at least some of the data transmission parameters are generated by the first dedicated data processing device;
wherein the first dedicated data processing device includes a RAKE receiver;
wherein the data transmission device is a direct memory access (DMA) data transmission device and the at least one data transmission channel is a DMA channel; and
wherein the data transmission parameters include a quantity of data, a source address and a destination address of the quantity of data moved.

2. The data processing apparatus as claimed in claim 1, wherein the first dedicated data processing device has a local data memory configured to store data to be transmitted.

3. The data processing apparatus as claimed in claim 1, wherein the central data processing device includes an internal data memory configured to store data transmitted to the central data processing device by the dedicated data processing devices.

4. The data processing apparatus as claimed in claim 3, wherein the internal data memory of the central data processing device has a size that is a multiple of a size of a local data memory of the first dedicated data processing device, the local data memory configured to store data to be transmitted.

5. The data processing apparatus as claimed in claim 4, wherein the internal data memory includes memory areas having a size of one time slot, and the local data memory of the first dedicated data processing device includes memory areas having a size of $1/10^{th}$ of a time slot.

6. The data processing apparatus as claimed in claim 1, wherein the data transmission parameters generated by the first dedicated data processing device change rapidly, and other data transmission parameters change slowly.

7. The data processing apparatus as claimed in claim 1, further comprising a central data transmission parameter memory configured to store data transmission parameters.

8. The data processing apparatus as claimed in claim 1 wherein the first dedicated data processing device includes a local data transmission parameter memory configured to store the data transmission parameters.

9. The data processing apparatus as claimed in claim 1, wherein the central data processing device comprises a digital signal processor.

10. A data processing apparatus having:
- a plurality of data processing devices including a central data processing device and a set of dedicated data processing devices, the set of dedicated data processing devices including a first dedicated data processing device of a first type and a second dedicated data processing device of a second type, the central data processing device configured to provide control signals to at least one of the set of dedicated data processing devices;
- at least one data transmission channel configured to provide data transmission between the plurality of data processing devices; and
- a data transmission device configured to cause the transmission of data between the plurality of data processing devices via the at least one data transmission channel in a manner dependent on data transmission parameters, wherein at least some of the data transmission parameters are generated by the first dedicated data processing device, and wherein data transmission parameters corresponding to the second dedicated data processing device are generated by the central data processing device;
- wherein the first dedicated data processing device includes a RAKE receiver;
- wherein the data transmission device is a direct memory access (DMA) data transmission device and the at least one data transmission channel is a DMA channel; and
- wherein the data transmission parameters include a quantity of data, a source address and a destination address of the quantity of data moved.

11. The data processing apparatus as claimed in claim 10, wherein the central data processing device stores the data transmission parameters corresponding to the second dedicated data processing device in a central data transmission parameter memory.

12. The data processing apparatus as claimed in claim 11 wherein the first dedicated data processing device includes a local data transmission parameter memory configured to store the data transmission parameters.

13. The data processing apparatus as claimed in claim 12, wherein the data transmission device is configured to read out the data transmission parameters generated by the first dedicated data processing device from the local data transmission parameter memory and to read out the data transmission parameters corresponding to the second dedicated data processing device from the central data transmission parameter memory for the purpose of controlling the data transmission.

14. The data processing apparatus as claimed in claim 11, wherein the first dedicated data processing device stores the data transmission parameters generated therein in the central data transmission parameter memory.

15. The data processing apparatus as claimed in claim 10, wherein the second dedicated data processing device has a local data transmission parameter memory configured to store at least some data transmission parameters.

16. The data processing apparatus as claimed in claim 15, wherein the data transmission device is configured to read out data transmission parameters from a local data transmission parameter memory of the first dedicated data processing device and to read out data transmission parameters from the local data transmission parameter memory of the second dedicated data processing device.

17. The data processing apparatus as claimed in claim 12 wherein the local data transmission parameter memory and the central data transmission parameter memory have normal memory elements and shadow memory elements.

18. The data processing apparatus as claimed in claim 10, wherein the second dedicated data processing device includes a channel decoder and a transmission module.

* * * * *